United States Patent [19]
Kashiwagi

[11] Patent Number: 5,753,272
[45] Date of Patent: May 19, 1998

[54] APPARATUS FOR MANUFACTURING COMPOSITE INSULATORS

[75] Inventor: Hiroshi Kashiwagi, Nagoya, Japan

[73] Assignee: NGK Insulators, Ltd., Japan

[21] Appl. No.: 617,102

[22] Filed: Mar. 18, 1996

[30] Foreign Application Priority Data

Mar. 20, 1995 [JP] Japan ................. 7-060415

[51] Int. Cl.⁶ .................................. B29C 43/18
[52] U.S. Cl. .................. 425/116; 174/174; 174/179; 264/254; 264/272.15; 264/274; 264/320; 425/195
[58] Field of Search .................. 425/116, 195, 425/408; 264/135, 139, 254, 274, 297.5, 320, 272.15; 174/174, 179

[56] References Cited

U.S. PATENT DOCUMENTS

| | | | |
|---|---|---|---|
| 4,476,081 | 10/1984 | Kaczerginski et al. | 264/262 |
| 4,654,478 | 3/1987 | Ishihara et al. | 174/176 |
| 4,702,873 | 10/1987 | Kaczerginski | 264/135 |
| 5,220,134 | 6/1993 | Novel et al. | 174/179 |
| 5,336,852 | 8/1994 | Goch et al. | 174/176 |
| 5,523,038 | 6/1996 | Kunieda et al. | 264/135 |
| 5,563,379 | 10/1996 | Kunieda et al. | 174/179 |

*Primary Examiner*—Jay H. Woo
*Assistant Examiner*—Iurie A. Schwartz
*Attorney, Agent, or Firm*—Wall Marjama & Bilinski

[57] ABSTRACT

Apparatus for manufacturing a composite insulator including an FRP core rod which is integrally provided with a sheath and a plurality of sheds formed of an electrically insulating polymeric material. The core rod has a longitudinal end portion provided with a seat for a metal fitting, which is integral with the sheath. To manufacture such a composite insulator, the core rod is placed in a mold cavity of a mold assembly, with a seat forming member detachably fitted to the end portion of the core rod and arranged between a pair of mold halves. An inner space is formed between a seat forming member and the core rod, which is in communication with the mold cavity. An electrically insulating polymeric material is introduced into the mold cavity to form the sheath and sheds, while admitting the polymeric material into the space between the seat forming member and the core rod so as to form a seat for the metal fitting, which is essentially free from burrs.

8 Claims, 4 Drawing Sheets

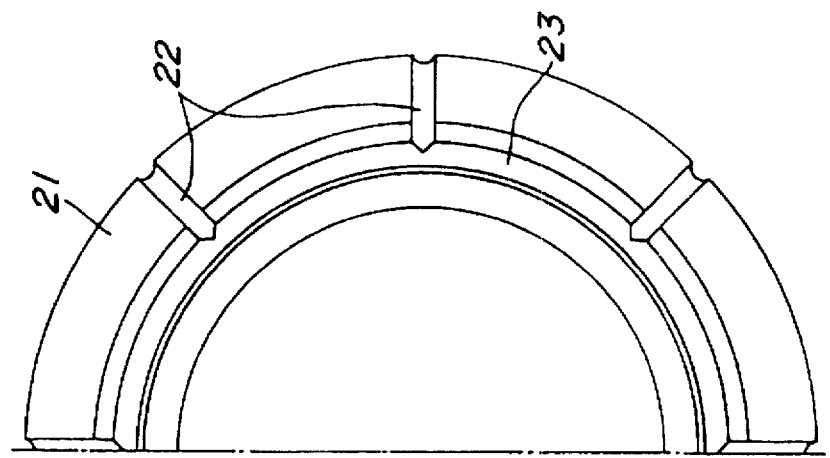
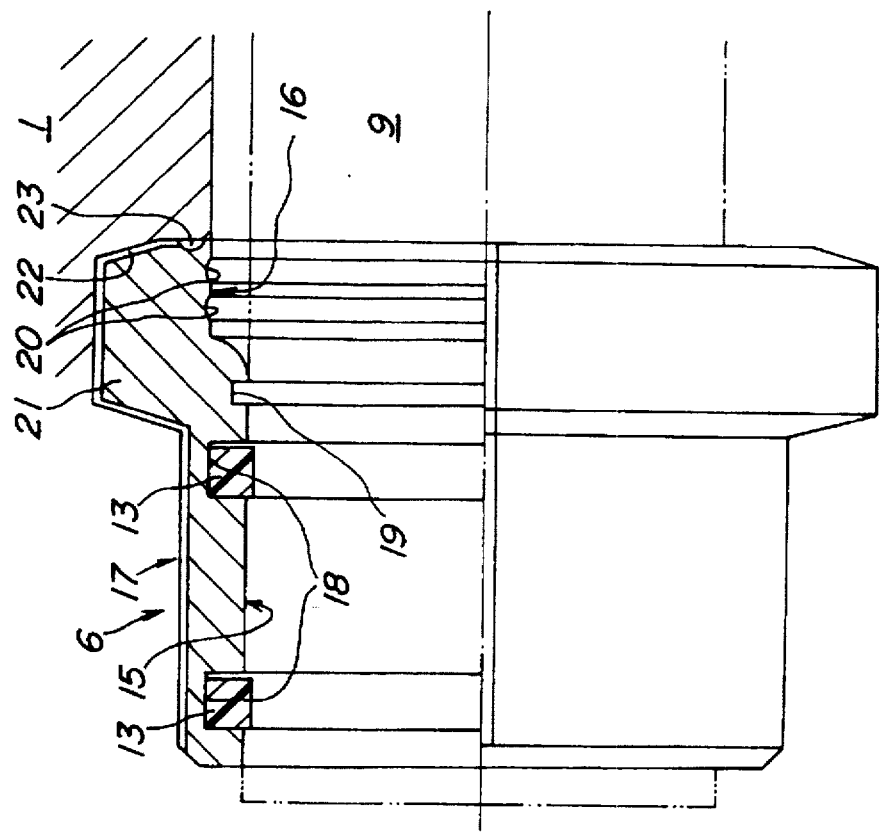

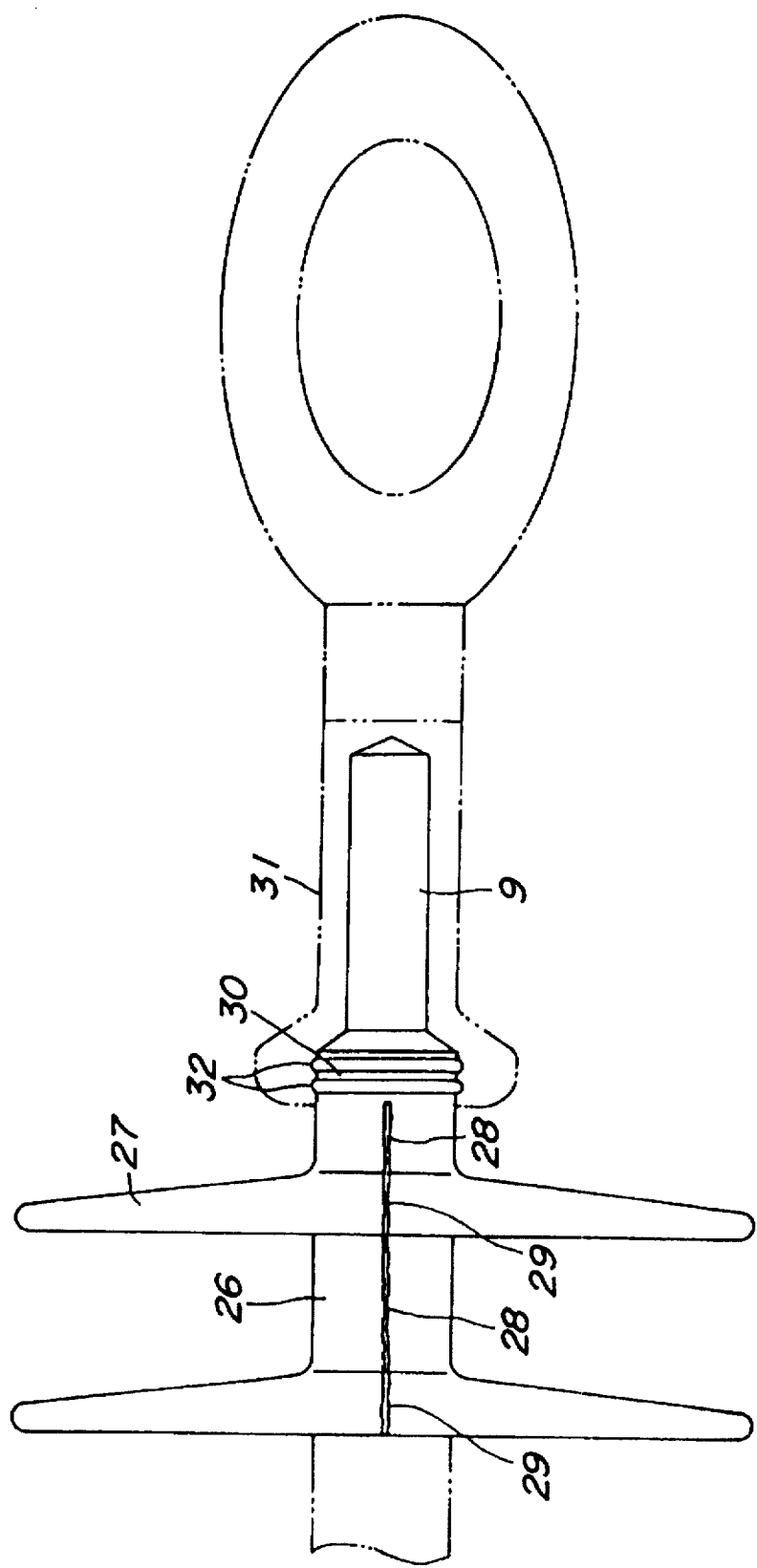
FIG._3

APPARATUS FOR MANUFACTURING COMPOSITE INSULATORS

BACKGROUND OF THE INVENTION

1. Field of the Invention

The present invention relates to a method and an apparatus for manufacturing composite electrical insulators which is comprised of a polymeric material.

2. Description of Related Art

There is known a composite electrical insulator which includes an elongate and solid or hollow core rod of fiber-reinforced plastics (FRP), a sheath covering the core rod over substantially the entire length thereof, and a plurality of sheds projecting radially outwards from the sheath and spaced from each other in a longitudinal direction of the core rod. The sheath and the sheds are integrally formed on the core rod by injection or transfer molding of appropriate polymeric material having an electrically insulating property, such as silicone rubber, ethylene propylene copolymer (EPM), ethylene propylene diene copolymer (EDPM), polyurethane, etc. The core rod has a longitudinal end portion provided with a seat which is integral with the sheath and to which a metal fitting can be fixedly secured. Such a composite insulator has been actually put into practical applications, particularly in any use environment which can draw out various functional advantages of the composite insulator.

In order to manufacture composite insulators, there is typically used a mold assembly which includes upper and lower mold halves defining a mold cavity when they are tightened and thereby closed. The mold cavity has an inner surface which substantially exactly corresponds to the outer shape of the sheath, sheds and seats to be formed on the core rod. Thus, with the core rod placed in the mold cavity, the polymeric material is injected or introduced into the mold cavity and cured therein to form the sheath, the sheds and the seats which are integral with the core rod. On such occasion, it is important not only to precisely position the core rod within the mold cavity, but also to prevent formation of burrs along the parting surface of the mold halves at locations corresponding to the seats at the end portions of the core rod, and to prevent leakage of the polymeric material from the longitudinal end portions of the mold assembly due to the following reasons.

That is to say, formation of burrs along the parting surface of the mold halves, hence along the seats at the end portions of the core rod, is disadvantageous in that the connection strength of the metal fitting which is fitted and crimped onto the seats at the end portions of the core rod becomes non-uniform in the circumferential direction of the core rod, and further in that rain water or the like foreign matters are liable to intrude into inside of the metal fitting when the composite insulator is in use, thereby degrading the performance of the insulator. On the other hand, leakage of the polymeric material from the end portions of the mold assembly is disadvantageous in that it lowers the yield of material and contaminates the mold assembly.

In a conventional mold assembly, it has been difficult or practically impossible to arrange a seal device within the assembly, which serves to effectively prevent formation of burrs along the parting surface of the mold halves, and/or sufficiently prevent leakage of the polymeric material from the end portions of the mold assembly in tight contact with the core rod within the mold cavity. Moreover, it has been also difficult to provide a vent passage within the mold assembly, which serves to smoothly discharge gas from the mold cavity without leakage of the polymeric material therethrough.

DISCLOSURE OF THE INVENTION

It is therefore an object of the present invention to provide improved method and apparatus for manufacturing composite insulators, which eliminate the above-mentioned drawbacks.

It is a primary object of the present invention to provide improved method and apparatus for manufacturing composite insulators, which effectively prevent formation of burrs on the seats for the metal fittings in the longitudinal end portions of the core rod, and/or leakage of the polymeric material from the end portions of the mold assembly.

It is another object of the present invention to provide improved method and apparatus for manufacturing composite insulators, which makes it readily possible form a vent passage for smoothly discharging gas from the mold cavity without leakage of the polymeric material therethrough.

According to one aspect of the present invention, there is provided a method of manufacturing a composite insulator which includes a core rod, a sheath covering the core rod over substantially the entire length thereof, and a plurality of sheds projecting radially outwards from the sheath and spaced from each other in a longitudinal direction of the core rod, said core rod having a longitudinal end portion provided with a seat which is integral with the sheath and to which a metal fitting can be fixedly secured, wherein said method comprises the steps of:

placing the core rod in a mold cavity of a mold assembly which is comprised of a pair of mold halves, with a seat forming member detachably fitted to the end portion of the core rod and arranged between the mold halves such that a space is formed between an inner surface of the seat forming member and an outer surface of the core rod, which spaced is in communication with the mold cavity; and introducing an electrically insulating polymeric material into the mold cavity to form said sheath and said sheds, while admitting the polymeric material into said space so as to form said seat for the metal fitting.

According to another aspect of the present invention, there is provided an apparatus for manufacturing a composite insulator which includes a core rod, as heath covering the core rod over substantially the entire length thereof, and a plurality of sheds projecting radially outwards from the sheath and spaced from each other in a longitudinal direction of the core rod, said core rod having a longitudinal end portion provided with a seat which is integral with the sheath and to which a metal fitting can be fixedly secured, wherein said apparatus comprises:

a mold assembly comprised of a pair of mold halves defining a mold cavity therebetween, said mold cavity being arranged so that said core rod can be placed therein; and a seat forming member which can be detachably fitted to the end portion of the core rod and arranged between the mold halves such that an inner space is formed between an inner surface of the seat forming member and an outer surface of the core rod, which inner spaced is in communication with the mold cavity so that an electrically insulating polymeric material, when it is introduced into the mold cavity to form said sheath and said sheds, is admitted into said inner space so as to form said seat for the metal fitting.

With the above-mentioned method and apparatus according to the present invention, the core rod is temporarily fitted with the seat forming member on its end portion and is then placed in the mold cavity of the mold assembly so that the seat forming member is arranged between the mold halves. By this, an inner space is formed between an inner surface of the seat forming member and an outer surface of the core rod, which inner spaced is in communication with the mold cavity. Thus, when the electrically insulating polymeric material is introduced into the mold cavity to form the sheath and the sheds, the polymeric material is admitted into the inner space between the inner surface of the seat forming member and the outer surface of the core rod, so as to form the seat for the metal fitting.

The seat for the metal fitting on the end portion of the core rod has an outer shape which is in exact conformity with the inner surface of the seat forming member. The seat as formed according to the present invention is essentially free from burrs which would be inevitably formed if the seat were formed directly by the opposite inner surfaces of the mold halves. Because the seat has an outer surface which is smooth throughout the entire circumference, when a metal fitting is fitted and crimped onto the seat, it is readily possible to achieve a satisfactory tightness and improved connection strength of the metal fitting which is uniform in the circumferential direction of the core rod. Also, rain water or the like foreign matters are prevented from entering into inside of the metal fitting when the composite insulator is in use, so that it is possible to stably maintain the desired water-tightness of the insulator.

The seat forming member is in tight contact with the core rod, preferably with a seal member therebetween, so as to prevent leakage from the axial end portion of the mold assembly, of the polymeric material which has been forced into a space between the core rod and the seat forming member, regardless of presence or absence of an axial bottom wall of the seat forming member.

According to a preferred embodiment of the present invention, the seat forming member comprises a first inner surface which can be tightly laid over the outer surface of the core rod, with a sealing member interposed therebetween, and a second inner surface which can be radially spaced from the outer surface of the core rod to define the inner space, wherein the first inner surface is arranged on a side which is remote from the mold cavity and the second inner surface is arranged on a side which is close to the mold cavity. In this instance, it is possible effectively to prevent formation of burrs on the seat for the metal fitting at the longitudinal end portion of the core rod, and leakage of the polymeric material from the end portions of the mold assembly.

According to a further advanced embodiment of the present invention, the second inner surface of the seat forming member is provided with at least one circumferential groove. The at least one circumferential groove on the second inner surface of the seat forming member serves to form at least one circumferential ridge on the outer surface of the seat for the metal fitting. Such a circumferential ridge provides a further improved connecting strength of the metal fitting when it is fitted and crimped onto the seat at the end portion of the core rod. The connecting strength of the metal fitting can be significantly improved particularly when the second inner surface of the seat forming member is provided with at least two circumferential grooves, or when at least two circumferential ridges are formed on the outer surface of the seat for the metal fitting.

According to still another embodiment of the present invention, the seat forming member has an outer surface provided with at least one longitudinal groove as a vent passage which can be brought into communication with the mold cavity. By connecting a vacuum-suction device to the longitudinal groove, gas within the mold cavity can be sufficiently and smoothly discharged along the longitudinal groove in the outer surface of the seat forming member, thereby effectively preventing formation of defective products. The longitudinal groove has a minimized cross-sectional area so that even when the polymeric material enters into the longitudinal groove, it is cured in the groove without causing leakage from the end portion of the mold assembly. Moreover, the polymeric material cured in the longitudinal groove can be readily removed when the mold assembly is opened and the seat forming member is removed from the mold assembly.

According to still another embodiment of the present invention, the seat forming member has an outer surface provided with a circumferential projection. The circumferential projection on the outer surface of the seat forming member ensures that the seat forming member can be accurately positioned in the longitudinal direction relative to the mold assembly, in a facilitated manner. The circumferential projection makes it readily possible to increase the total length of the vent passage, thereby further effectively preventing leakage of the polymeric material from the end portion of the mold assembly.

BRIEF DESCRIPTION OF THE DRAWINGS

The present invention will now be explained in further detail hereinafter, with reference to certain preferred embodiments shown in the accompanying drawings, in which:

FIG. 2A is a fragmentary sectional view showing one embodiment of the seat forming member for forming the seat on the end portion of the core rod, on which a metal fitting is to be fixedly secured;

FIG. 2B is a partial front view of the seat forming member of FIG. 2A;

FIG. 3 is a fragmentary side view showing the end portion of the composite insulator.

DETAILED DESCRIPTION OF THE PREFERRED EMBODIMENTS

Figure 1:
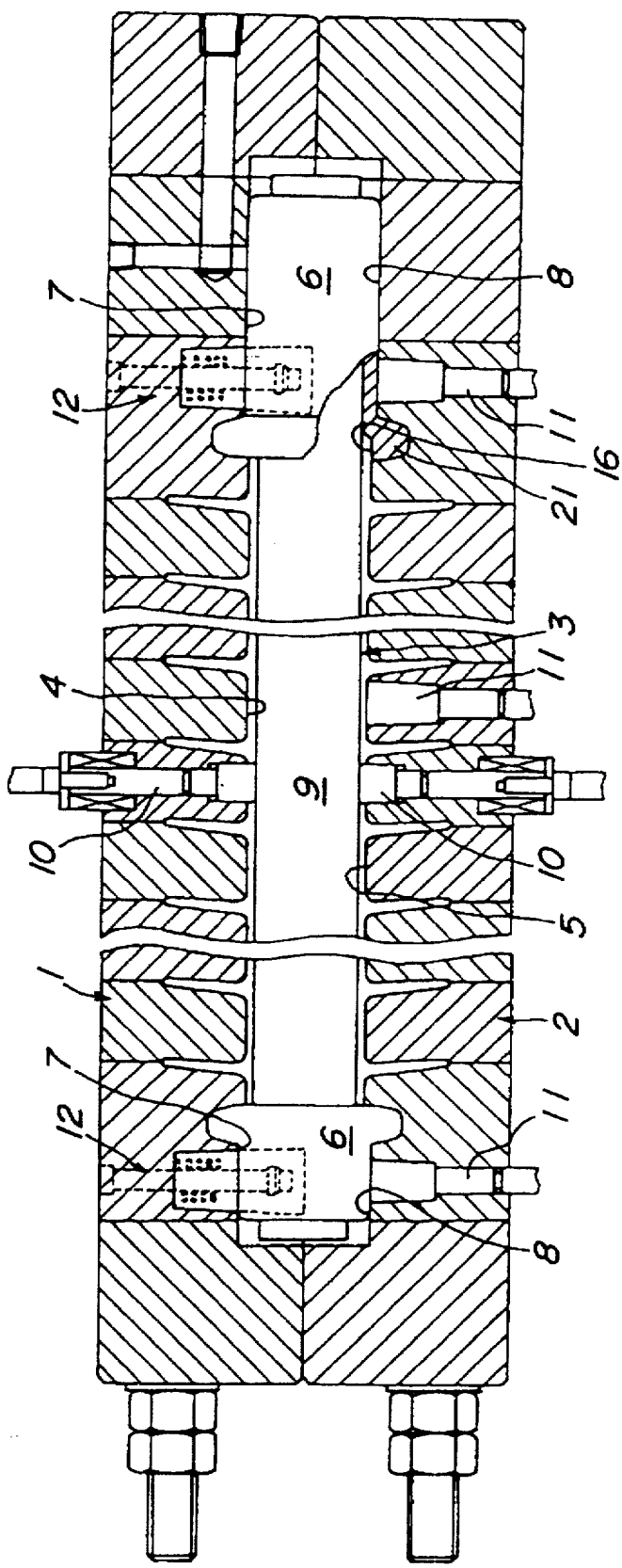
FIG. 1 is a longitudinal sectional view showing the mold assembly for manufacturing composite insulators, according to one embodiment of the present invention.

Referring now to FIG. 1, there is shown a mold assembly according to one embodiment of the present invention, which forms part of a transfer or injection molding machine. The mold assembly comprises an upper mold half 1 and a lower mold half 2 which are tightened with respect to each other as shown in FIGS. 1 and 2, so that a mold cavity 3 is defined by an inner surface 4 of the upper mold half 1 and an opposite inner surface 5 of the lower mold half 2. In order to open the mold assembly, at least one of the upper and lower mold halves 1, 2 is moved away from the other. In the illustrated embodiment, it may be assumed that the mold assembly is opened by moving the lower mold half 2 downwards while maintaining the upper mold half 1 stationary.

The molding machine further includes runner and the like passages for a polymeric material having an electrically insulating property, which is to be introduced into the mold cavity 3, such as silicone rubber, ethylene propylene copolymer (EPM), ethylene propylene diene copolymer (EDPM), polyurethane, etc., as well as heating and cooling devices for the mold assembly, which are conventional in the art. Therefore, for the sake of simplicity, these elements are omitted in the drawings.

In a tightened state of the mold assembly as shown in FIG. 1, before a polymeric material is introduced into the mold cavity 3, a core rod 9 comprised of a fiber-reinforced plastic (FRP) material is positioned in the center portion of the mold cavity 3, together with seat forming members 6 which will be more fully described hereinafter. The seat forming members 6 are temporarily fitted onto the longitudinal end portions of the core rod 9 so as to form seats for metal fittings 31. For positioning and holding the seat forming members 6, the inner surfaces 4, 5 of the upper and lower mold halves 1, 2 are provided with respective set surface portions 7, 8 which are each in the form of a circumferential groove or depression.

The mold assembly further includes upper and lower support members 10 which can be projected radially inwards to support the core rod 9 and prevent it from deformation or deflection during injection or introduction of the polymeric material into the mold cavity 3. The support members 10 can be retracted radially outwards in the final stage of injection or introduction of the polymeric material.

The lower mold half 2 is provided with ejector members 11 which are operative when the mold assembly is fully opened, for removing the composite insulator from the inner surface 5 of the lower mold half 2 by lifting it to a predetermined level. The ejector members 11 are actuated by an appropriate drive device, not shown, which may be a pneumatic or hydraulic cylinder or other mechanical means.

Furthermore, the upper mold half 2 is provided with ejector members 12 at its end regions corresponding to the seat forming members 6 on the core rod 9. The ejector members 12 may be accommodated in recesses formed in the upper mold half 2. The ejector members 12 are movable in a direction perpendicular to the parting surface of the upper and lower mold halves, i.e., toward and away from the lower mold half 2, and biased by a spring toward the lower mold half 2. The ejector members 12 are so designed that the resultant force of the entire springs is smaller than the tightening force of the upper and lower mold halves 1, 2, but greater than a force required for removing the composite insulator from the upper mold half 1. Thus, when the mold assembly is closed under the tightening force, the ejector members 12 are completely retracted into the recesses in the upper mold half 1 against the force of the springs. On the contrary, when the tightening force is relieved and the mold assembly is being opened, the ejector members 12 are projected toward the lower mold half 2 under the force of the springs.

The arrangement of the seat forming member 6 to be temporarily fitted onto the end portions of the core rod 9 will be explained below with reference to FIGS. 2A and 2B.

The seat forming member 6 comprises a cylindrical body 17 which is to be positioned and retained between the upper and lower mold halves 1, 2. The cylindrical body 17 has an inner sealing surface 15 which is to be tightly laid over the outer surface of the core rod 9, with at least one seal ring 13 interposed therebetween. The seal ring 13 may be comprised of rubber or appropriate fluoride resin, such as polytetrafluoroethylene. The cylindrical body 17 further has an inner forming surface 16 of a relatively large diameter, which is coaxial to the inner sealing surface 15 and which is to be radially spaced from the outer surface of the core rod 9 to define an inner space. The inner sealing surface 15 is arranged on a side which is remote from the mold cavity 3, and the inner forming surface 16 is arranged on a side which is close to the mold cavity 3.

As particularly shown in FIGS. 2A and 2B, the inner sealing surface 15 of the cylindrical body 17 has two circumferential grooves 18 for receiving the respective seal rings 13, and another circumferential groove 19 as an intercepting recess for the polymeric material which has been injected or introduced into the mold cavity. In this instance, the seal ring 13 may have cut ends to be brought into abutment with, and adhered to each other after it has been positioned relative to the groove 18 so that substantial part of the seal ring 13 in its thickness direction is accommodated within the groove 18. Further, the inner forming surface 16 has two circumferential grooves 20 for forming two circumferential ridges 20 on the seat for the metal fitting at the end portion of the core rod 9.

As further shown in FIGS. 2A and 2B, the cylindrical body 17 has an outer surface which is provided with a circumferential projection 21. This projection has a cross-section which is tapered toward radially outer side so that the cylindrical body 17 can be fitted into a recess defined by, and between the set surface portions 7, 8 of the upper and lower mold halves 1, 2. Thus, it is readily possible to accurately position the cylindrical body 17 relative to the mold assembly, in its longitudinal direction. The outer surface of the cylindrical body 17 is further provided with a plurality of longitudinal grooves 22 which are spaced from each other in the circumferential direction. These grooves 22 extend from one end to the other of the cylindrical body 17, and may be directly communicated with the mold cavity 3 so as to discharge gas from the mold cavity 3 to outside.

Alternatively, as in the illustrated embodiment, the longitudinal grooves 22 may be communicated with the mold cavity 3 via an annular clearance 23 which is situated between opposite end walls of the set surfaces 7, 8 and the circumferential projection 21 of the cylindrical body 17.

The longitudinal grooves 22 in the outer surface of the cylindrical body 17 have a sufficient length to effectively prevent entry of the polymeric material from the mold cavity 3 into the grooves 22. Even in the event that the polymeric material is forced into the grooves 22, it is cured within the groove thereby effectively preventing leakage of the polymeric material from the end portion of the mold assembly. The effective length of the grooves 22 can be readily increased by the interposition of the circumferential projection 21.

The operation of the mold assembly in combination with the seat forming members according to the illustrated embodiment of the present invention will be explained below.

First of all, the core rod 9 is temporarily fitted with the seat forming members 6 on its longitudinal end portions and placed on the inner surface 5 of the lower mold half 2 in the open state of the mold assembly so that the seat forming members 6 are engaged with the set surfaces 8 of the lower mold half 2. By this, the core rod 9 can be accurately positioned at the center of the mold cavity 3, when the mold assembly is tightened and thereby closed. The core rod 9 within the mold cavity 3 is supported by the support members 10 when they are projected radially inwards. In this instance, each ejector member 12 of the upper mold half 1 is retracted upwards against the associated spring, and completely accommodated within the recess with its lower edge in contact with the outer surface of the seat forming member 6 and partly with the lower mold half 2. The polymeric material is then injected or introduced into the mold cavity 3 while discharging gas from the mold cavity 3 through the longitudinal grooves 22 and admitting the polymeric material into the mold cavity 3 into the space between the outer surface of the core rod 9 and the inner forming surface 16 of the cylindrical body 17.

On such occasion, the seal rings 13 at the inner sealing surface 15 prevent leakage of the polymeric material through the gap along the inner surface of the cylindrical body 17 and the outer surface of the core rod 9. Also, the longitudinal groove 22 having a sufficient length prevent leakage of the polymeric material through the gap along the outer surface of the cylindrical body 17 and the inner set surfaces 7, 8 of the mold halves 1, 2.

The support members 10 are retracted radially outwards in the final stage of injection or introduction of the polymeric material. The polymeric material which has been injected or introduced into the mold cavity 3 and admitted into the space between the outer surface of the core rod 9 and the inner forming surface 16 of the cylindrical body 17 is cured within the mold assembly.

As the curing of the polymeric material is substantially completed within the mold cavity 3, a sheath and sheds are formed on the core rod 9. Then, the tightening force is relieved from the mold assembly and the lower mold half 2 is moved downwards away from the upper mold half 1 to open the mold assembly. On such occasion, following the downward movement of the lower mold half 2, the ejector members 12 are gradually projected from the recess in the upper mold half 1 toward the lower mold half 2, under the restoring force of the springs. Since the lower edges of the ejector members 12 are in contact with the seat forming members 6 on the longitudinal end portions of the core rod 9, the composite insulator which has been shaped within the mold cavity 3 is forcibly, yet smoothly removed from the upper mold half 1 while being maintained tightly urged against the inner surface 5 of the lower mold half 2. During removal of the composite insulator from the upper mold half 1, the composite insulator is applied with the force of the springs through the seat forming members 6 on both end portions of the core rod 9. Therefore, the composite insulator is prevented from being applied with undesirable external force such as twisting force.

The downward projecting movement of the ejector members 12 toward the lower mold half 2 is continued until the mold assembly is completely opened and the composite insulator is fully removed from the upper mold half 1. The ejector members 12 are then maintained in their projected positions until the mold assembly is tightened and closed once again. In other words, the ejector members 12 are moved against the force of the associated springs to their retracted positions within the recesses, when the mold assembly is closed by the tightening force.

After the mold assembly has been completely opened with the composite insulator fully removed from the upper mold half 1, the ejector members 11 provided for the lower mold half 2 are actuated to lift the composite insulator from the inner surface 5 of the lower mold half 2. The composite insulator is then ready for removal from the mold assembly. After the composite insulator has been removed from the mold assembly and the seat forming members 6 are disengaged from the end portions of the core rod 9, appropriate metal fittings are fixedly secured to the end portions of the core rod 9 to form the final product, e.g., by a crimping process as disclosed in U.S. Pat. No. 4,654,478.

As shown in FIG. 3, the composite insulator manufactured by the above-mentioned process has a sheath 26 which covers the core rod 9 over substantially the entire length thereof, a plurality of sheds 27 which project radially outwards from the sheath 26 and spaced from each other in the longitudinal direction of the core rod 9, and seats 30 for the metal fittings 31 on the longitudinal end portions of the core rod 9. The sheath 26 and the sheds 27 are formed by the inner surfaces 4, 5 of the upper and lower mold halves 1, 2 so that burrs 28, 29 may be formed on the sheath 26 and the sheds 27 to extend along the parting surface between the two mold halves 1, 2. However, the seats 30 on the longitudinal end portions of the core rod 9 are formed by the inner forming surface 16 of the cylindrical body 17 which is an integral member without a parting surface so that burrs are not formed on the seats 30 for the metal fittings 31.

Because the seats 30 each has an outer surface which is smooth throughout the entire circumference, when a metal fitting 31 is fitted and crimped onto the seat 30, it is readily possible to achieve a satisfactory tightness and improved connection strength of the metal fitting which is uniform in the circumferential direction of the core rod. It is also possible to prevent rain water or the like foreign matters from entering into inside of the metal fitting 31 when the composite insulator is in use, thereby ensuring the desired water-tightness of the insulator to be stably maintained.

Figure 4:
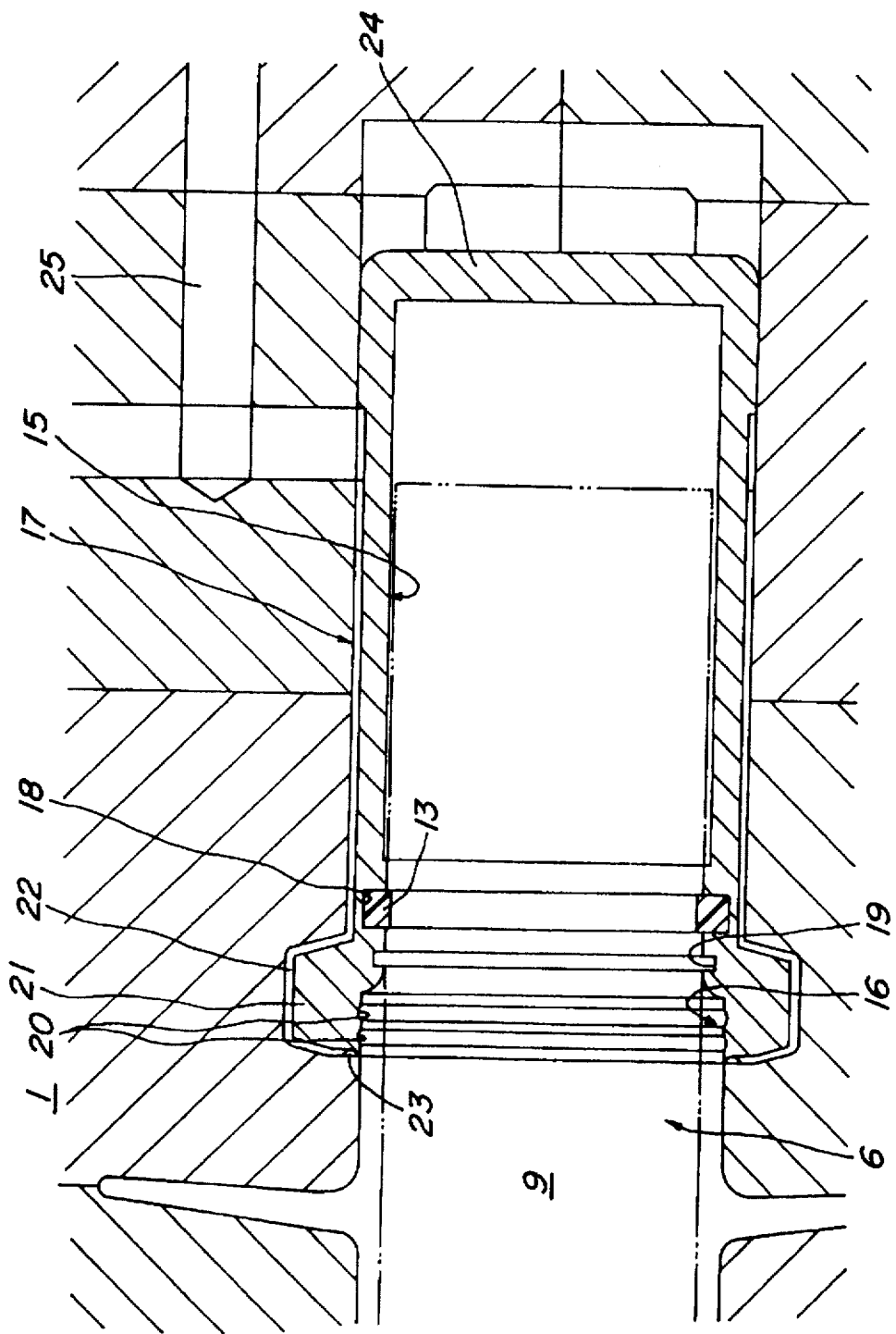
FIG. 4 is a fragmentary sectional view showing another embodiment of the seat forming member for forming the seat on the end portion of the core rod.

Another embodiment of the seat forming member 6 is shown in FIG. 4, in which the cylindrical body 17 has an end wall 24 in its outer longitudinal end region which is remote from the circumferential projection 21, so that the cylindrical body 17 as a whole is in the form of a cap. In this instance, even when the polymeric material from the mold cavity 3 is forced into a gap between the inner seal surface 15 of the cylindrical body 17 and the outer surface of the core rod 9, the polymeric material is blocked by the end wall 24 of the cylindrical body 17. Thus, there may be provided only a single groove 18 for the inner seal surface 15, for accommodating the seal ring 13 therein. The longitudinal grooves 22 on the outer surface of the cylindrical body 17 may be terminated at a location longitudinally spaced from the end wall 24, where they are communicated with a vent passage 25 formed in the mold assembly. The seat forming member 6 according to this embodiment functions essentially in the same manner as the previous embodiment.

It will be appreciated from the foregoing description that the present invention provides improved method and apparatus for manufacturing composite insulators, which effectively prevent formation of burrs along the seats for the metal fittings, and/or leakage of the polymeric material from the end portions of the mold assembly. It is further possible readily to form a vent passage for smoothly discharging gas from the mold cavity, without leakage of the polymeric material therethrough.

While the present invention has been described with reference to specific embodiments, it should be noted that they were presented by way of examples only and various modifications and/or changes may be made without departing from the scope of the invention as defined by the appended claims.

I claim:

1. An apparatus for manufacturing a composite insulator that includes a core rod, a sheath covering the core rod over substantially the entire length thereof, and a plurality of sheds projecting radially outward from the sheath and spaced from each other in a longitudinal direction of the core rod, said core rod having a longitudinal end portion provided with a seat that is integral with the sheath and to which a metal fitting can be fixedly secured, said apparatus comprising:
- a mold assembly comprised of a pair of mold halves defining a mold cavity therebetween, said mold cavity being arranged so that said core rod can be placed therein;
- a seat forming member that can be detachably fitted to the end portion of the core rod and arranged between the mold halves such that an inner space is formed between an inner surface of the seat forming member and an outer surface of the core rod, said seat forming member having a first inner surface that can be tightly laid over the outer surface of the core rod, with a sealing member interposed therebetween, and a second inner surface that can be radially spaced from the outer surface of the core rod to define said inner space;
- said first inner surface being arranged on the side that is remote from the mold cavity, and said second inner surface being arranged on a side that is close to said mold cavity; and
- said inner space being in communication with the mold cavity so that an electrically insulating polymeric material, when introduced into the mold cavity to form said sheath and said sheds, is admitted into said inner space so as to form said seat for the metal fitting.

2. The apparatus according to claim 1, wherein said second inner surface of the seat forming member is provided with at least one circumferential groove.

3. The apparatus according to claim 1, wherein said seat forming member has an outer surface provided with at least one longitudinal groove, said at least one longitudinal groove being in communication with said mold cavity.

4. The apparatus according to claim 1, wherein said seat forming member has an outer surface provided with a circumferential projection.

5. A seat forming member for a mold assembly for manufacturing a composite insulator, said composite insulator comprising a core rod, a sheath covering the core rod over substantially the entire length thereof, and a plurality of sheds projecting radially outward from the sheath and spaced from each other in a longitudinal direction of the core rod, said core rod having a longitudinal end portion provided with a seat that is integral with the sheath and to which a metal fitting can be fixedly secured, and said mold assembly being comprised of a pair of mold halves defining a mold cavity therebetween, said mold cavity being arranged so that said core rod can be placed therein, said seat forming member comprising:
- a first inner surface that can be tightly laid over the outer surface of the core rod, with a sealing member interposed therebetween;
- a second inner surface that can be radially spaced from the outer surface of the core rod to define said inner space;
- said first inner surface being arranged on a side that is remote from the mold cavity, and said second inner surface being arranged on a side which is close to said mold cavity; and
- said seat forming member being adapted to be detachably fitted to the end portion of the core rod and arranged between the mold halves such that an inner space is formed between an inner surface of the seat forming member and an outer surface of the core rod;
- said inner space being in communication with the mold cavity so that an electrically insulating polymeric material, when introduced into the mold cavity to form said sheath and said sheds, is admitted into said inner space so as to form said seat for the metal fitting.

6. The seat forming member according to claim 5, wherein said second inner surface is provided with at least one circumferential groove.

7. The seat forming member according to claim 5, having an outer surface which is provided with at least one longitudinal groove, said at least one longitudinal groove being in communication with said mold cavity.

8. The seat forming member according to claim 5, having an outer surface which is provided with a circumferential projection.

* * * * *